United States Patent Office 3,819,759
Patented June 25, 1974

3,819,759
POLYESTER MOLDING COMPOSITIONS WITH TRIARYL PHOSPHATE AND A POLYPHENYLENE OXIDE OR A POLYCARBONATE OF BISPHENOL A
James C. Weaver, Theodore F. Gray, Jr., and Robert L. Combs, Kingsport, Tenn., assignors to Eastman Kodak Company, Rochester, N.Y.
No Drawing. Filed Oct. 6, 1972, Ser. No. 295,623
Int. Cl. C08g 39/10
U.S. Cl. 260—860                3 Claims

ABSTRACT OF THE DISCLOSURE

Tricomponent blends of copoly(bisphenol A terephthalate/isophthalate), triaryl phosphate and either poly-(2,6-dimethyl phenylene oxide) or bisphenol 9 polycarbonate, or mixtures thereof possess reduced melt viscosity characteristic of the effect of addition of low-molecular-weight additives while maintaining mechanical properties characteristic of polymer addition. These compositions can be extruded and injection molded at temperatures unexpectedly lower than is characteristic of either type of bicomponent system to give extruded sheet and films, photographic base film, foamed articles, and blow-molded bottles having good mechanical properties.

The present invention concerns the addition of monomeric compounds and polymeric materials to certain polyesters resulting in a synergistic effect on improving the processability of the polyester.

Unmodified copoly(bisphenol A terephthalate/isophthalate) wherein the terephthalate moiety comprises from about 40 to about 70 mole percent of the acid portion requires very high melt temperatures such as 380° C. for 65 mole percent terephthalate moiety in order to process it. Polymeric additives, if compatible, may result in a slight reduction in melt viscosity but generally are incorporated to maintain or improve mechanical properties.

An object therefore of the present invention is to modify such copolyesters to reduce the necessary processing temperatures and to retain good physical properties in the molded article.

This and other objects hereinafter appearing have been attained in accordance with the present invention by the use of tricomponent blends of the aforesaid copolyester, triaryl phosphate and either poly(2,6 dimethylphenylene oxide) or bisphenol A polycarbonate, or mixtures thereof. Such blends possess reduced melt viscosity characteristic of the effect of addition of low-molecular-weight additives while maintaining mechanical properties characteristic of polymer addition. They also can be extruded and injection molded at temperatures unexpectedly lower than is characteristic of either type of bicomponent systems. Such a combination of mechanical properties and processability is new and results in compositions that are quite useful for molded articles, extruded sheet and films, photographic base film, foamed articles, and blow-molded bottles.

The useful copolyesters are of bisphenol A and terephthalic and isophthalic acid wherein the terephthalic acid comprises from about 40 to about 70 mole percent preferably from about 50 to about 70 mole percent of the acid component, and has an I.V. of from about 0.4 to about 1.0, preferably from about 0.55 to about 8.0.

The triaryl phosphate concentration may range from about 2 to about 20 percent by weight, preferably from about 5 to about 15 percent by weight, and likewise for the poly(2,6-dimethyl phenylene oxide) which has an I.V. of from about 0.1 to about 1.0, preferably from about 0.25 to about 0.5, and the bisphenol A polycarbonate having an I.V. of from about 0.2 to about 1.0, preferably from about 0.3 to about 0.6. Mixtures of the poly(2,6-dimethyl phenylene oxide) and the bisphenol A polycarbonate may total from about 2 to about 20 percent by weight. These I.V.'s are measured in a 60/40 weight ratio of phenol/tetrachloroethane solvent at a concentration of 0.5 g. of polymer in 100 ml. of solvent, heated and stirred 15 min. at 125° C. The measurement is made at 23° C.

The tricomponent system resulting in improving the processability of the copoly(bisphenol A terephthalate/isophthalate) is new and unexpected. Normally only low-molecular-weight additives are introduced to decrease the processing temperature of a polymer. The present result is unexpected in that the polymeric additive is introduced to maintain the mechanical properties of the polymer that are normally sacrificed by the addition of low-molecular-weight processing aid; however, this addition also decreased the processing temperature. The invention has the advantages, beyond those cited in the prior art, of not only improving some properties lost upon the addition of 10% triphenyl phosphate but also the processing temperature is decreased to a level below that previously obtained upon the addition of either a low-molecular-weight additive or a polymer as a second component. It is also seen that the invention provides a synergistic improvement in processability of copoly(bisphenol A terephthalate/isophthalate) obtained upon the addition of triphenyl phosphate in combination with either bisphenol A polycarbonate or poly(2,6-dimethylphenylene oxide). Moreover the addition of the triaryl phosphate and a polymer to the polyester results in a molded plastic that has higher ultimate tensile strength, higher elongation, and greater hardness than the polyester modified with only a triaryl phosphate.

In the examples below, a dry blend is employed of 2 mm. diameter powder prepared from copoly(bisphenol A 65/35 terephthalate/isophthalate) which contains 65 mole percent terephthalate and 35 mole percent isophthalate, 10 weight percent of either bisphenol A polycarbonate or poly(2,6-dimethylphenylene oxide) (2 mm. diameter powder), and 10 weight percent of triphenyl phosphate. These blends are dried overnight in vacuo at approximately 120° C. and melt blended in an extruder. The extrudate is chopped into ⅛-inch pellets and dried as described above. Flow rates at 330° C. are determined using a Tinius-Olsen rheometer employing 2160 g. weight, 0.0825 inch diameter and 0.315 inch long die (modified ASTM D–1238). The blends are injection molded into tensile and flexural bars and tested according to ASTM D–638 and D–785 procedures. In addition to flow rate differences, improvements in processability are noted from the melt temperatures required for extruding and molding.

EXAMPLE 1

This example illustrates the advantage of incorporating a polymer as a third component with copoly(bisphenol A 65/35 terephthalate/isophthalate) for improving the processability of the polyester. The polymers are first granulated to pass a 2-mm. screen, then 120 g. of copoly(bisphenol A 65/35 terephthalate/isophthalate) are mixed with 15 g. of bisphenol A polycarbonate and 15 g. of triphenyl phosphate and likewise 120 g. polyester are mixed with 15 g. poly(2,6-dimethylphenylene oxide( and 15 g. triphenyl phosphate. Each mixture contains 80% polyester, 10% of the second polymer and 10% of a triaryl phosphate. Also, 135 g. polyester are mixed with 15 g. triphenyl phospate (10 weight percent). These three blends, as well as an unmodified polyester control, are vacuum dried at 120° C. overnight and melt blended in a Brabender Plastograph extruder. The pelletized extrudates are again dried and flow rates at 330° C. obtained by testing in a Tinius-Olsen rheometer. They are also injection molded in a Watson-Stillman ram-type machine.

TABLE 1

| Additive(s) | Extrusion temperature, °C. | Molding temperature, °C. | Flow rate at 330° C. g./10 min. |
|---|---|---|---|
| None | 353 | 385 | 2.63 |
| Triphenyl phosphate | 340 | 343 | 15.20 |
| Triphenyl phosphate and Bisphenol A polycarbonate | 328 | 316 | 18.25 |
| Triphenyl phosphate and poly(2,6-dimethylphenylene oxide) | 332 | 316 | 14.45 |

EXAMPLE 2

The tricomponent blends described above are also superior to the control and the triphenyl phosphate-modified polyester in tensile strength, elongation and hardness. This example illustrates the improvements obtained in mechanical properties for the molded tricomponent blends. Tensile Strength at Break is measured according to ASTM D-638 with 2 in./min. crosshead speed. Elongation at Break was measured similarly at 2 in./min. crosshead speed. Elongation at Break was measured similarly at 2 in./min. crosshead speed.

TABLE 2

| Additive(s) | Tensile strength break, p.s.i. | Elongation at break, percent | Hardness |
|---|---|---|---|
| None | 10,700 | 77 | L-108 |
| Triphenyl phosphate | 10,100 | 74 | L-106 |
| Triphenyl phosphate and Bisphenol A polycarbonate | 10,900 | 89 | L-118 |
| Triphenyl phosphate and poly(2,6-dimethylphenylene oxide) | 11,500 | 96 | L-111 |

The last two compositions are blow molded into bottles which are useful in that they can be steam sterilized without distortion and/or filled with hot peanut butter without deterioration of their properties.

Although the invention has been described in considerable detail with particular reference to certain preferred embodiments thereof, variations and modifications can be effected within the spirit and scope of the invention as described hereinabove, and as defined in the appended claims.

We claim:

1. The composition of matter comprising copolyesters of bisphenol A and terephthalic and isophthalic acid wherein the terephthalic acid comprises from about 40 to about 70 mole percent of the acid component, said copolyester having an I.V. of from about 0.4 to about 1.0, blended with modifiers comprising triaryl phosphate at a concentration ranging from about 2 to about 20 percent by weight, and with poly(2,6-dimethyl phenylene oxide) at a concentration of from about 2 to about 20 percent by weight and having an I.V. of from about 0.1 to about 1.0 or with from about 2 to about 20 percent by weight of bisphenol A polycarbonate having and I.V. of from about 0.2 to about 1.0, or with mixtures of the poly(2,6-dimethyl phenylene oxide) and the bisphenol A polycarbonate totaling from about 2 to about 20 percent by weight.

2. The composition of Claim 1 wherein the terephthalic acid comprises from about 50 to about 70 mole percent of the acid component.

3. The composition of Claim 1 wherein the modifier content is from about 5 to about 15 percent by weight of the blend.

References Cited

UNITED STATES PATENTS 3,567,799  3/1971  Prevorsek _____ 260—860
3,703,564  11/1972 White _____ 260—860

WILLIAM H. SHORT, Primary Examiner

T. E. PERTILLA, Assistant Examiner

U.S. Cl. X.R.

260—45.7 P